UNITED STATES PATENT OFFICE.

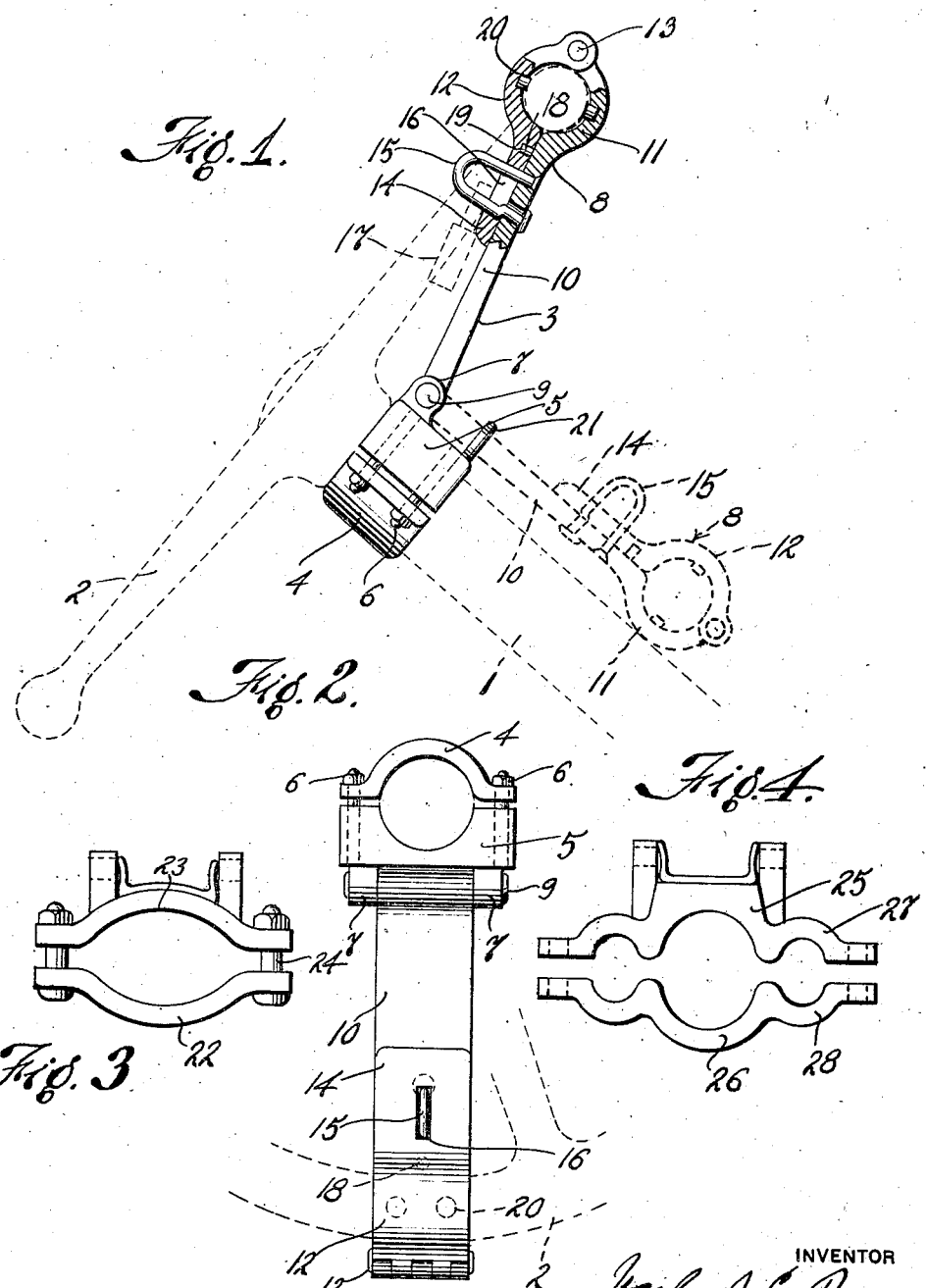

WESLEY J. LA RUE, OF MARGARETVILLE, NEW YORK.

STEERING-WHEEL LOCK.

1,178,080.

Specification of Letters Patent.     Patented Apr. 4, 1916.

Application filed September 25, 1915. Serial No. 52,719.

*To all whom it may concern:*

Be it known that I, WESLEY J. LA RUE, a citizen of the United States, residing at Margaretville, in the county of Delaware and State of New York, have invented certain new and useful Improvements in Steering-Wheel Locks, of which the following is a specification.

My invention relates to locking devices and more particularly to an improved vehicle lock of a type designed for association with the steering column and steering wheel of an automobile.

An object of the invention is to provide a positive means whereby the steering wheel may be locked against turning movement relatively to the steering column.

A further object of the invention is to provide an improved locking device of the character described wherein the supporting element is adapted for securement to the steering column and the locking element for engagement with the steering wheel.

A still further object of the invention is to provide a support means for the locking element of such novel and peculiar construction as to permit movement of the latter into and out of locking relation with the steering wheel; said element in a non-locking position extending contiguous to the steering column in adjacent proximity to said wheel.

The above and additional objects are accomplished by such means as are illustrated in their preferred embodiment in the accompanying drawings, described in the following specification and then more particularly pointed out in the claim which is appended hereto and forms a part of this application.

In describing my invention in detail reference will be had to the accompanying drawings wherein like characters denote like or corresponding parts throughout the several views, and in which:

Figure 1 is an elevation of my improved vehicle lock, partly in section, illustrating its association and application with and to the steering column and steering wheel of an automobile; Fig. 2 is a plan view of the mentioned device; Fig. 3 is an elevation of a modification; and Fig. 4 is an elevation of a second or further modification.

Before proceeding with a description of the drawings I desire to call particular attention to the fact that while I have evolved my invention with reference to its use in connection with the steering column and the steering wheel of an automobile, the same, if desired, may be associated and used with the steering mechanism of any and all vehicles utilizing a steering column and steering wheel.

Referring now to the drawings by numerals, 1 designates the steering column or post of an automobile, and 2 the steering wheel mounted at one end thereof.

The device of my invention, designated as an entirety by the numeral 3 is adapted for securement to the steering column 1 in proximity to the steering wheel 2 that the locking element, more particularly hereinafter described, may be moved from a non-locking position contiguous to the steering column to a position in locking relation with said wheel. In Fig. 1 I have shown in dotted lines the position of the locking element during operation of the machine.

In its preferred embodiment the locking device may be said to consist of opposed clamping jaws designated respectively 4 and 5 mounted to engage with the steering column in the manner shown, the bolts indicated at 6 affording a fastening means whereby said jaws are held in contact with the steering column and in such opposed relation as to securely and positively provide a locking or fastening means for the wheel engaging portion hereinafter more particularly described.

Ears 7 are formed integrally with the jaw 5 of the fastening means that said wheel engaging portion, designated as an entirety by the numeral 8 may be pivoted as at 9 to said fastening means. The wheel engaging portion or locking element 8 comprises an arm 10 offset at its free end or as indicated at 11 to form, by reason of its semi-circular formation, a part of the clamp means whereby said arm 10 is adapted for locking relation with the wheel. A complemental clamping member 12 is pivoted as at 13 to the free end of the arm 10 to coact with the offset portion 11 thereof in affording the clamping means. An extension 14 is formed upon said member 12 to extend, in the locked position of the element 8, contiguous to the arm 10 that a retaining element 15 may engage therewith. Said element 15 is made fast to the arm 10 by any suitable means, and in the locked position of the extension 14 is adapted to fit an opening 16 therefor formed in said extension. A lock device (preferably of the key operated type) designated 17 is adapted for engagement with the retaining element 15 that said element may be secured against movement relatively to the extension 14 when it is desired that the steering wheel 2 be locked.

As an auxiliary lock means for the member 12 I provide a pin 18 which is adapted for fitting engagement with a recess 19 therefor formed in said member 12 in proximity to the opening 16 hereinbefore described. Said pin 18 not only acts as an auxiliary fastening means but also as a means whereby lateral displacement of the member 12 cannot, under any circumstances, take place, when locked. Anti-friction devices 20 are mounted, one upon each of the clamping members 11 and 12 that the steering wheel 2 may be positively gripped and held by the locking element 8 when engaged thereby.

To preclude rattling, and to afford a means whereby the locking element 8 is maintained in a non-locking position, I provide spring retaining arms 21, said arms being fastened to or integral with the clamping jaw 5. The arm 10 of the locking element will contact with the spring retaining arm 21 when said element is moved into the position indicated by the dotted lines in Fig. 1.

Coming now to a description of the modification illustrated in Fig. 3, 22 and 23 designate the respective clamping jaws which are adapted for engagement with the steering column and 24 the fastening means. In the modification illustrated in Fig. 4, the clamping jaws 25 and 26 therein shown are laterally extended as indicated at 27 and 28 to overlap such parts of an automobile as may be found to extend parallel with the steering column 1.

From the foregoing, taken in connection with the accompanying drawings it is evident that an unauthorized use of an automobile equipped with my improved locking device cannot, under any circumstances occur; that the locking device, when not in use, will lie contiguous to the steering column and in such proximity to the steering wheel as to be readily moved into a locking position, when desired; and that through the agency of the retaining arms 21 all movement of the locking element incident to vibration of the machine will be eliminated, thus rendering the device noiseless and in no way objectionable to the occupants of the car.

In reduction to practice, I have found that the form of my invention, illustrated in the drawings and referred to in the above description, as the preferred embodiment, is the most efficient and practical; yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as defined in the appended claim.

Having thus fully described my invention, what I claim as new and desire to secure by Letters Patent, is:—

In a steering wheel lock, an arm movable into and out of a position in engagement with the under face of the steering wheel, a clamping device connected to said arm at the free end thereof for movement into and out of a position in engagement with the top face of the steering wheel, a pin secured to the arm for fitting engagement in a recess therefor formed in the clamping device to maintain said device in parallel contiguous relation thereto when locked, friction lugs formed on the wheel engaging portion of the arm and on the clamping device at a substantially diametrically opposite point to preclude relative turning movement of the steering wheel, and a means to releasably lock the clamping device in engagement with the arm.

In testimony whereof I affix my signature in presence of two witnesses.

WESLEY J. LA RUE.

Witnesses:
C. C. BRANSBY,
W. G. REDMOND.